United States Patent
Mohr et al.

(10) Patent No.: US 10,767,996 B2
(45) Date of Patent: Sep. 8, 2020

(54) SYSTEM AND METHODS FOR REDUCING THE MAP SEARCH SPACE REQUIREMENTS IN A VISION-INERTIAL NAVIGATION SYSTEM

(71) Applicant: Honeywell International Inc., Morris Plains, NJ (US)

(72) Inventors: Benjamin Mohr, Plymouth, MN (US); Vijay Venkataraman, Excelsior, MN (US)

(73) Assignee: Honeywell International Inc., Morris Plains, NJ (US)

( * ) Notice: Subject to any disclaimer, the term of this patent is extended or adjusted under 35 U.S.C. 154(b) by 260 days.

(21) Appl. No.: 15/974,629

(22) Filed: May 8, 2018

(65) Prior Publication Data

US 2019/0346269 A1 Nov. 14, 2019

(51) Int. Cl.
*G01C 21/16* (2006.01)
*G06K 9/62* (2006.01)
(Continued)

(52) U.S. Cl.
CPC ......... *G01C 21/165* (2013.01); *G06K 9/6267* (2013.01); *G06N 3/08* (2013.01);
(Continued)

(58) Field of Classification Search
CPC . G06T 17/05; G06T 7/11; G06T 2207/20021; G06K 9/6267; G01C 21/165; G06N 3/08
See application file for complete search history.

(56) References Cited

U.S. PATENT DOCUMENTS

| 4,700,307 A | 10/1987 | Mons et al. |
| 5,144,685 A * | 9/1992 | Nasar ................... G05D 1/0246 |
| | | 348/119 |

(Continued)

FOREIGN PATENT DOCUMENTS

| CN | 101046387 A | 10/2007 |
| EP | 0427431 A2 | 5/1991 |

OTHER PUBLICATIONS

Durrie et al., "Vision-Aided Inertial Navigation on an Uncertain Map Using a Particle Filter", "2009 IEEE International Conference on Robotics and Automation, Kobe, Japan", May 12-17, 2009, pp. 4189-4194, Publisher: IEEE.

(Continued)

*Primary Examiner* — Mussa A Shaawat
(74) *Attorney, Agent, or Firm* — Fogg & Powers LLC

(57) ABSTRACT

A system and methods for reducing map search area requirements in a navigation system are disclosed. The system includes a vehicle, an imaging device onboard the vehicle configured to generate an image scan, receive at least one image responsive to the image scan, and a processing device configured to receive and store the at least one image. The system further includes a navigation system onboard the vehicle configured to store an image of a map, and a learning network associated with the navigation system and configured to divide the image of the map into a plurality of map subsections, recognize each one of a plurality of images of different landmarks on the map, generate a set of classifications for each map subsection, and associate each classification of the set of classifications with at least one landmark of the different landmarks on the map.

20 Claims, 5 Drawing Sheets

(51) Int. Cl.
G06N 3/08 (2006.01)
G06T 17/05 (2011.01)
G06T 7/11 (2017.01)

(52) U.S. Cl.
CPC ............... *G06T 7/11* (2017.01); *G06T 17/05* (2013.01); *G06T 2207/20021* (2013.01)

(56) References Cited

U.S. PATENT DOCUMENTS

| | | | |
|---|---|---|---|
| 7,962,285 | B2 | 6/2011 | Breed |
| 9,103,671 | B1 | 8/2015 | Breed et al. |
| 10,599,161 | B2* | 3/2020 | Kennedy ............... B64C 39/024 |
| 2017/0272651 | A1 | 9/2017 | Mathy et al. |
| 2018/0045519 | A1* | 2/2018 | Ghadiok ............... G05D 1/0246 |
| 2019/0026538 | A1* | 1/2019 | Wang ..................... G06T 7/20 |
| 2019/0050000 | A1* | 2/2019 | Kennedy ............... G06K 9/0063 |
| 2019/0271550 | A1* | 9/2019 | Breed .................... G01S 19/49 |

OTHER PUBLICATIONS

Kemker et al, "Algorithms for Semantic Segmentation of Multispectral Remote Sensing Imagery Using Deep Learning", "Preprint Submitted to Deep Learning for Remotely Sensed Data, Sep. 22, 2017", Dated Jun. 21, 2017, pp. 1-45.

Xia et al, "AID: A Benchmark Dataset for Performance Evaluation of Aerial Scene Classification", "http://www.lmars.whu.edu.cn/xia/AID-project.html", Dated Feb. 27, 2017, pp. 1-4, Publisher: Gui-Song Xia 2016.

Xia et al, "AID: A Benchmark Dataset for Performance Evaluation of Aerial Scene Classification", Dated Aug. 19, 2016, pp. 1-25.

Cheng et al., "Remote Sensing Image Scene Classification: Benchmark and State of the Art", Mar. 1, 2017, pp. 1-17, Cornell University Library.

European Patent Office, "Extended European Search Report from EP Application No. 19172403.8", from Foreign Counterpart to U.S. Appl. No. 15/974,629, dated Oct. 1, 2019, pp. 1-10, Published: EP.

Lindsten et al., "Geo-Referencing for UAV Navigation using Environmental Classification", IEEE International Conference on Robotics and Automation, May 2010, pp. 1420-1425, Anchorage Convention District.

Yao et al., "Sensing Urban Land-Use Patterns by Integrating Google Tensorflow and Scene-Classifications Models", ISPRS—International Archives of the Photogrammetry, Remote Sensing and Spatial Information Sciences, Aug. 1, 2017, pp. 1-8.

Zhu et al., "Deep Learning in Remote Sensing: A Review", IEEE Geoscience and Remote Sensing Magazine. In Press, Oct. 12, 2017, pp. 1-60, IEEE.

European Patent Office, "Communication pursuant to Article 94(3) EPC from EP Application No. 19172403.8", from Foreign Counterpart to U.S. Appl. No. 15/974,629, dated Jul. 10, 2020, p. 1 through 4, Published: EP.

* cited by examiner

SYSTEM AND METHODS FOR REDUCING THE MAP SEARCH SPACE REQUIREMENTS IN A VISION-INERTIAL NAVIGATION SYSTEM

BACKGROUND

Vision-Inertial Navigation Systems (VINS) combine information from camera images (vision aiding) with information from inertial sensors (inertial aiding) to determine a vehicle's position, velocity and attitude. These systems provide a promising alternative to traditional GPS-INS systems, which are vulnerable to interference and jamming. Existing VINS can be separated into two categories: 1) systems that operate without pre-existing maps, such as optical flow, visual odometry and Simultaneous Localization and Mapping (SLAM) systems; and 2) systems that compare pre-existing maps to real-time imagery. The present disclosure refers to the latter type.

A key limitation of existing VINS is that they require clear, unobstructed views of environments that contain landmarks suitable for navigation purposes. Consequently, for airborne applications, during a time period while a vehicle with VINS is passing over cloud cover or featureless terrain (e.g., water), navigation errors increase over time without vision aiding (e.g., referred to as free-inertial error growth). Therefore, when the vehicle again reaches a suitably visible environment (e.g., clouds cleared or landfall made), the VINS has to re-localize itself by performing a search over a large area. Such a search involves comparing a real-time image from an onboard camera to a large area on a pre-existing map stored in the VINS. Depending on the length of time that the VINS has traveled during the outage period, and the quality of the sensor information provided by the vehicle's Inertial Measurement Unit (IMU), the map area that must be searched can be exceptionally large (e.g., up to thousands of square kilometers). As such, a significant problem that arises with existing VINS is that the process of searching such a large area of the map requires a substantial amount of computing resources. Consequently, such a search can take up a significant amount of time for an onboard processor to complete, which is an impractical result especially for airborne applications. Therefore, the need exists for a technique that can be utilized to significantly reduce the map area that must be searched by a VINS after an outage period has occurred, and thus enable the VINS to substantially reduce the recovery period and processing time required after experiencing a significant period of free-inertial drift.

For the reasons stated above and for other reasons stated below which will become apparent to those skilled in the art upon reading and understanding the specification, there is a need in the art for methods for reducing the map search area requirements in a vision-aided navigation system.

SUMMARY

Embodiments disclosed herein provide a system and methods that can be utilized to reduce the map search area requirements in a vision-aided navigation system such as, for example, a vision-inertial navigation system (VINS), and will be understood by reading and studying the following specification.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout the figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Deep Learning is an emerging technology that utilizes artificial neural networks to automate and thereby improve numerous tasks. One of the most well-established uses for Deep Learning is image recognition. For example, an image is input to a neural network, and the Deep Learning system produces a classification for the image that identifies it as fitting into one of numerous categories that the neural network is trained to recognize (e.g., dog, cat, house, etc.). First, however, the Deep Learning algorithm is trained to recognize different types of landmarks (houses, ponds, forest, rivers, school, park, stadium, etc.) observed in downward-looking aerial imagery taken at various, different altitudes. Also, for example, the Deep Learning algorithm can be trained to recognize such landmark types as airports, lakes, farms, cities, and the like.

Prior to the flight, a pre-existing map utilized in the VINS is divided into subsections, and each subsection is input to the neural network for classification. For example, in one embodiment, the subsections can be overlapping. In a second embodiment, the subsections can be non-overlapping, and in a third embodiment, some of the subsections can be overlapping and others of the subsections can be non-overlapping. In any event, the neural network develops a set of classifications for each subsection of the map. Notably, the neural network provides classification probabilities rather than singular classifications. For example, in one embodiment, a subsection's set of classifications might include a probability of 67% that the subsection includes a farm field, a probability of 20% that the subsection includes a park, and a probability of 12% that the subsection includes a house, etc.

Figure 1:
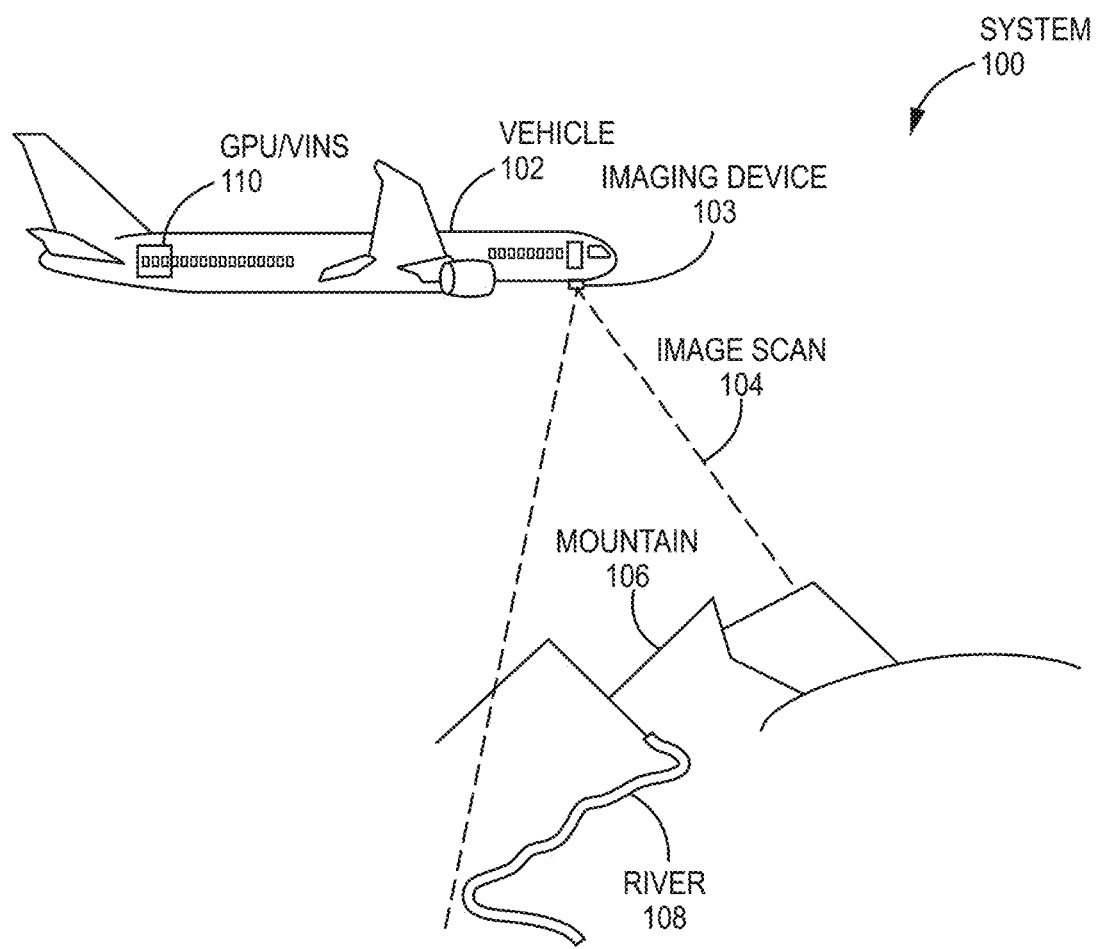
FIG. 1 is a diagram illustrating a system that can be utilized to implement one example embodiment of the present invention.

FIG. 1 is a diagram illustrating a system 100, which can be utilized to implement one example embodiment of the present invention. Referring to FIG. 1, the exemplary system 100 includes a vehicle 102 in flight. For the illustrative embodiment depicted in FIG. 1, the vehicle 102 is an aircraft (e.g., general aviation aircraft, military aircraft, unmanned aerial vehicle (UAV) or drone, and the like). However, in a second embodiment, the vehicle 102 could be, for example, a spacecraft, missile, guided bomb, large caliber projectile (e.g., munitions) or any other vehicle capable of utilizing vision-inertial navigation for guidance while in flight.

For this example embodiment, the vehicle 102 includes an onboard imaging device 103. For example, the imaging device 103 can be a camera or other type of imaging device that is configured to scan for, and view and store, images of terrain in one of or more of the visible band of frequencies, the infra-red band, the millimeter wave (e.g., radar) band, and the like. In the example embodiment shown in FIG. 1, an imaging scan 104 for the imaging device 103 is enabled to view images of one or more mountains 106 and a river 108. The image information captured by the imaging device 103 is coupled by a suitable communications link to a graphics processing unit (GPU) for digitizing and processing, and stored in a central processing unit (CPU). In this exemplary embodiment, the GPU and CPU are components of an onboard VINS 110.

Figure 2:
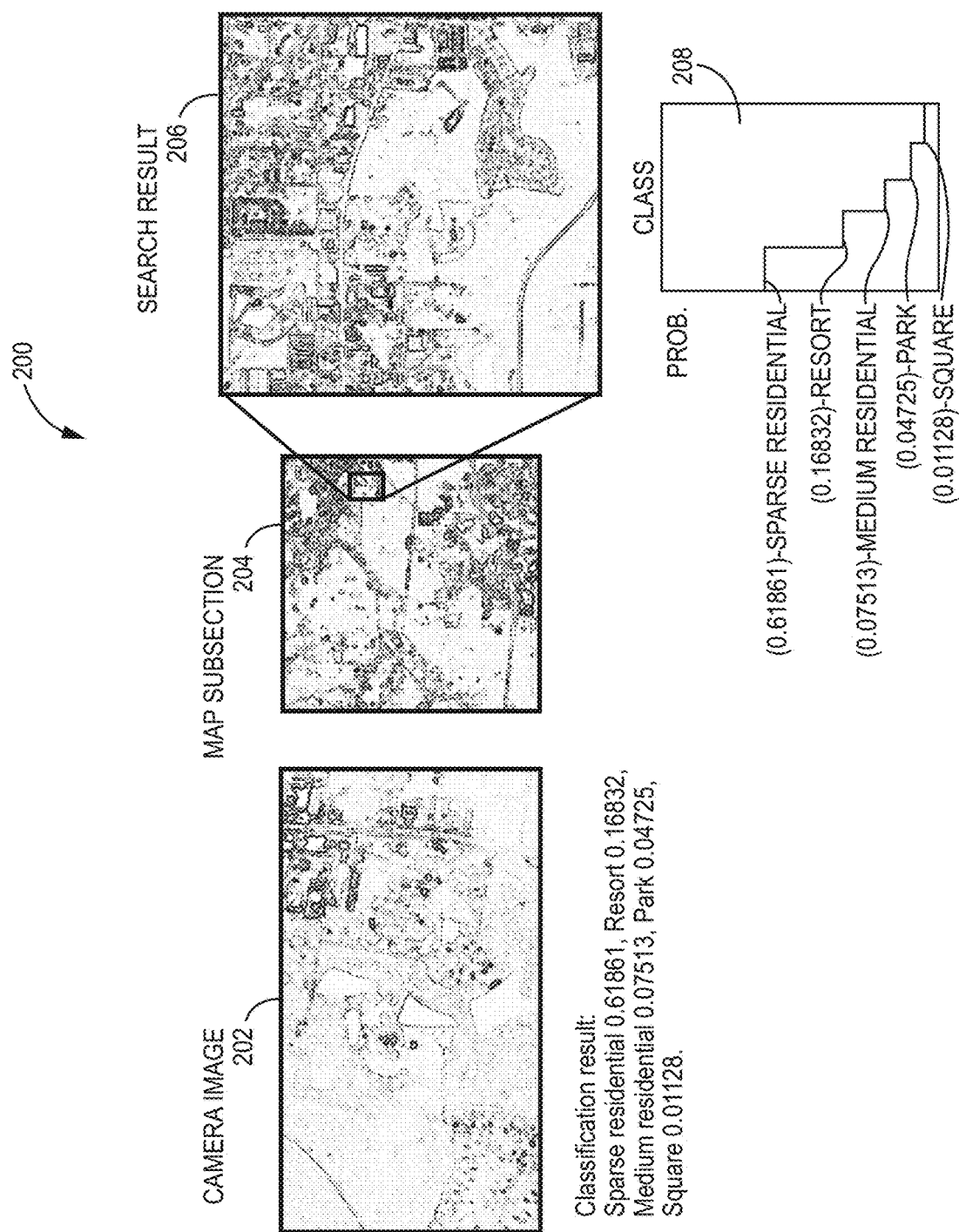
FIG. 2 is a pictorial diagram illustrating a technique that can be utilized to enhance the search performance of a vision-inertial navigation system (VINS), in accordance with one exemplary embodiment of the present invention.

FIG. 2 is a pictorial diagram illustrating a technique 200 that can be utilized to enhance the search performance of a vision-inertial navigation system (VINS), in accordance with one exemplary embodiment of the present invention. Referring to the example embodiment depicted in FIG. 2, an imaging device (e.g., 103 in FIG. 1) onboard a vehicle in flight (e.g., vehicle 102) receives an image 202 of the terrain below, and the image 202 is coupled by a suitable communications link to the GPU/VINS (e.g., 110) onboard the vehicle. The GPU/VINS feeds or inputs the image data into a neural network residing in the VINS. The neural network then generates a set of classifications for the landmarks recognized in the image 202.

For example, referring to the camera image 202 depicted in FIG. 2, the neural network has classified the landmarks recognized in the image as follows: (1) 0.61861 probability that one classification type in the image is "sparse residential"; (2) 0.16832 probability that a second classification type in the image is "resort"; (3) 0.07513 probability that a third classification type in the image is "medium residential"; (4) 0.04725 probability that a fourth classification type in the image is "Park"; and (5) 0.01128 probability that a fifth classification type in the image is "Square". In other words, these probabilities indicate the likelihood that the image 202 includes the landmarks described. Notably, in one embodiment, these camera image classifications are preferably performed by the neural network in the VINS 110 while the imaging device is online.

Prior to the flight of the vehicle 102, an operator loads a suitable (e.g., aerial navigation) map (e.g., offline) into the neural network of the VINS 110. The map includes, but is not limited to, the prospective course of the vehicle 102. In one embodiment, the map is divided into a plurality of subsections (e.g., 512 by 512 square, non-overlapping subsections). In a second embodiment, for example, some or all of the subsections could be overlapping and/or the subsections could be dimensioned differently than 512 by 512 square. Referring to FIG. 2, the map subsection 204 exemplifies one of the subsections created by the neural network of the VINS 110. The neural network then creates a set of probabilities for the landmarks recognized in the map subsections involved.

While the vehicle 102 is airborne, in one embodiment, the neural network identifies the top five (e.g., by probability) classes present in the image 202. The neural network then identifies where the five classes are present in the map subsection (e.g., base map) 204. For example, the neural network can add together or otherwise combine the probabilities of the five classes in the image 202, and search for areas in the map subsection 204 having the same or similar enough (e.g., substantially similar) combined probabilities. For example, the neural network can limit the space required to perform the search by utilizing a suitable probability threshold value to limit the search. Notably, the search result 206 is an inset indicating where the neural network determined that the five classes in the image 202 are present in the base map 204. In other words, as indicated by the bar chart 208, the classification results for the image 202 were similar enough to (e.g., probabilities were similar enough or substantially matched) the classification results for the area depicted in the search result 206. It is important to note that the above-described technique substantially reduces the area of the map that has to be searched.

Figure 3:
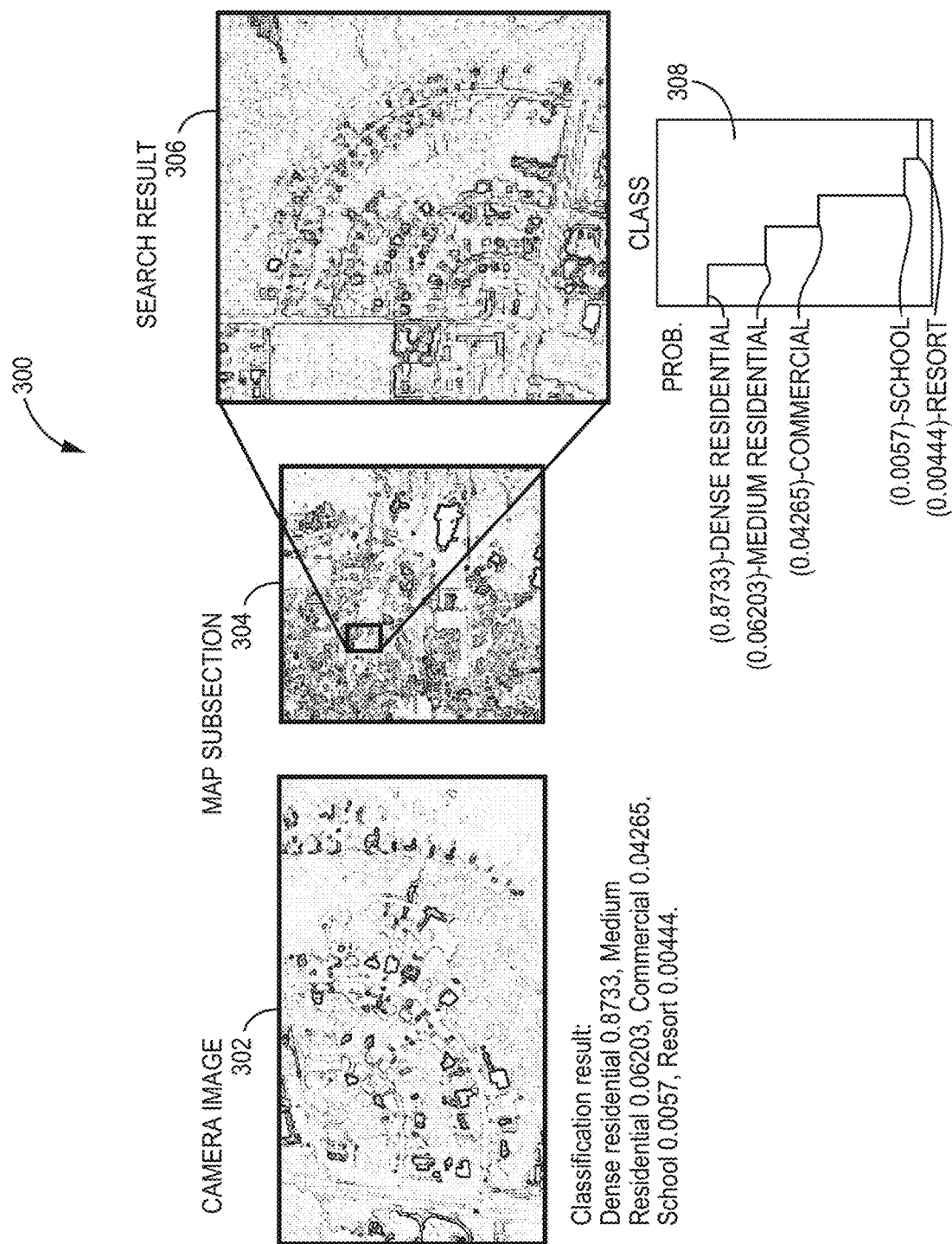
FIG. 3 is a second pictorial diagram further illustrating the technique that can be utilized to enhance the search performance of a vision-inertial navigation system (VINS), in accordance with one exemplary embodiment of the present invention.

FIG. 3 is a second pictorial diagram also illustrating the above-described technique that can be utilized to enhance the search performance of a vision-inertial navigation system (VINS), in accordance with one exemplary embodiment of the present invention. For example, referring to the example embodiment depicted in FIG. 3, an imaging device (e.g., 103 in FIG. 1) onboard a vehicle in flight (e.g., vehicle 102) receives an image 302 of the terrain below, and the image 302 is coupled by a suitable communications link to the GPU/VINS (e.g., 110) onboard the vehicle. The GPU/VINS feeds or inputs the image data into a neural network residing in the VINS. The neural network then generates a set of classifications for the landmarks recognized in the image 302. For example, referring to the camera image 302 depicted in FIG. 3, the neural network has classified the landmarks recognized in the image as follows: (1) 0.8733 probability that one classification type in the image is "dense residential"; (2) 0.06203 probability that a second classification type in the image is "medium residential"; (3) 0.04265 probability that a third classification type in the image is "commercial"; (4) 0.0057 probability that a fourth classification type in the image is "School"; and (5) 0.00444 probability that a fifth classification type in the image is "Resort". In other words, these probabilities indicate the likelihood that the image 302 includes the landmarks described. Notably, in one embodiment, these camera image classifications are preferably performed by the neural network in the VINS 110 while the imaging device is online.

Prior to the flight of the vehicle 102, an operator loads a suitable (e.g., aerial navigation) map (e.g., offline) into the neural network of the VINS 110. The map includes, but is not limited to, the prospective course of the vehicle 102. In one embodiment, the map is divided into a plurality of subsections (e.g., 512 by 512 square, non-overlapping subsections). In a second embodiment, for example, some or all of the subsections could be overlapping and/or the subsections could be dimensioned differently than 512 by 512 square. Referring to FIG. 3, the map subsection 304 exemplifies one of the subsections created by the neural network of the VINS 110. The neural network then creates a set of probabilities for the landmarks recognized in the map subsections involved.

In one embodiment, while the vehicle 102 is airborne, the neural network identifies the top (e.g., by probability) classes present in the image 302. Notably, in this embodiment, the neural network identifies the top five classes present in the image 302. However, the number of classes identified is not intended to be limiting, and therefore, any suitable number of classes present in the image 302 can be identified by the neural network. In any event, the neural network then identifies where the identified (e.g., five) classes are present in the map subsection (e.g., base map) 304. For example, the neural network can add together or otherwise combine the probabilities of the five classes in the image 302, and search for areas in the map subsection 304 having the same or substantially similar combined probabilities. For example, the neural network can limit the space required to perform the search by utilizing a suitable probability threshold value to limit the search. Notably, the search result 306 is an inset indicating where the neural network determined that the five classes in the image 302 are present in the base map 304. In other words, as indicated by the bar chart 308, the classification results for the image 302 were similar enough to (e.g., probabilities were similar enough or substantially matched) the classification results for the area depicted in the search result 306. It is important to note that the above-described technique substantially reduces the area of the map that has to be searched.

Figure 4:
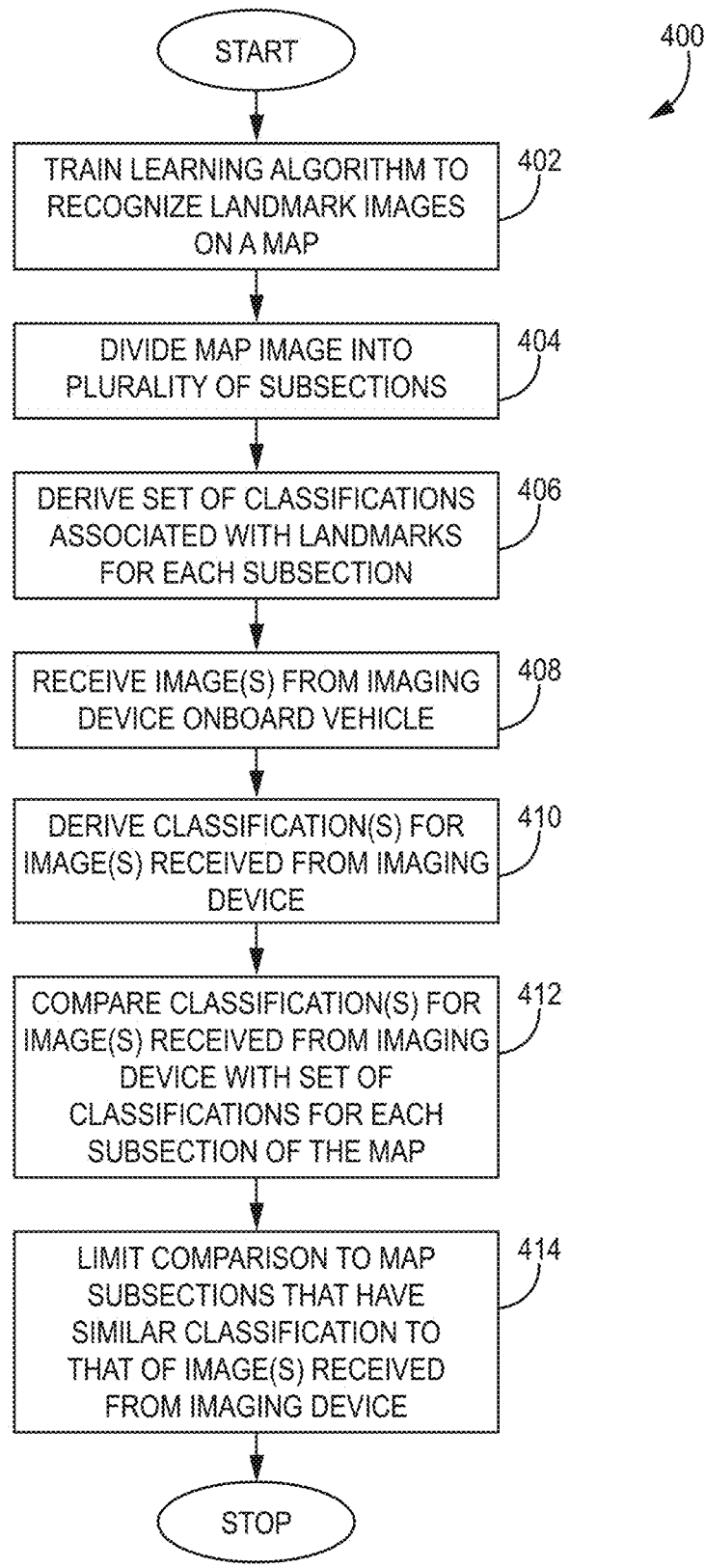
FIG. 4 is a flow diagram illustrating a method that can be utilized to implement one example embodiment of the present invention.

FIG. 4 is a flow diagram illustrating a method 400, which can be utilized to implement one example embodiment of the present invention. Referring to the example embodiments depicted in FIGS. 1-4, the exemplary method begins with an operator loading a (e.g. aerial navigation) map image into a neural network associated with a learning (e.g., Deep Learning) algorithm in the GPU/VINS 110, and utilizing the inherent landmark recognition capability of the neural network in the GPU/VINS 110, the operator thereby trains the learning algorithm to recognize the landmark images on the map (402). For example, in one embodiment, the map image can be loaded (e.g., offline) into the neural network prior to the mission or flight of the vehicle 102.

Next, the learning algorithm in the GPU/VINS 110 divides the map image in the neural network into a plurality of subsections (404). For example, in one embodiment, the map image can be divided into 512 by 512 square non-overlapping or overlapping subsections. The neural network (in response to the learning algorithm) then derives or generates a set of classifications for the landmarks identified in each subsection of the map image (406). More precisely, the neural network generates a set of landmark classifications for each map subsection.

For this exemplary embodiment, once the vehicle 102 embarks on its mission or flight, the GPU/VINS 110 receives (e.g., on-line and in real-time) one or more images from the imaging device 103 onboard the vehicle 102 (408). In response to the learning algorithm, the neural network in the GPU/VINS 110 derives or generates a set of landmark classifications for each image received from the imaging device 103 (410). Next, in association with the learning algorithm, the neural network (e.g., utilizing a suitable matching algorithm) in the GPU/VINS 110 compares the classification set for the image received from the imaging device 103 with the classification sets for the subsections of the map (412). For example, in one embodiment, the neural network (e.g., utilizing the matching algorithm) identifies the top (e.g., 5 by probability) classes present in the image received from the imaging device 103 and then identifies where those top classes are present in a map subsection. As such, in this exemplary embodiment, the neural network combines the probabilities of the classes present in the image, and limits the comparison to any of the map subsections that have the same or substantially similar combined probabilities (414). The method is then terminated.

Figure 5:
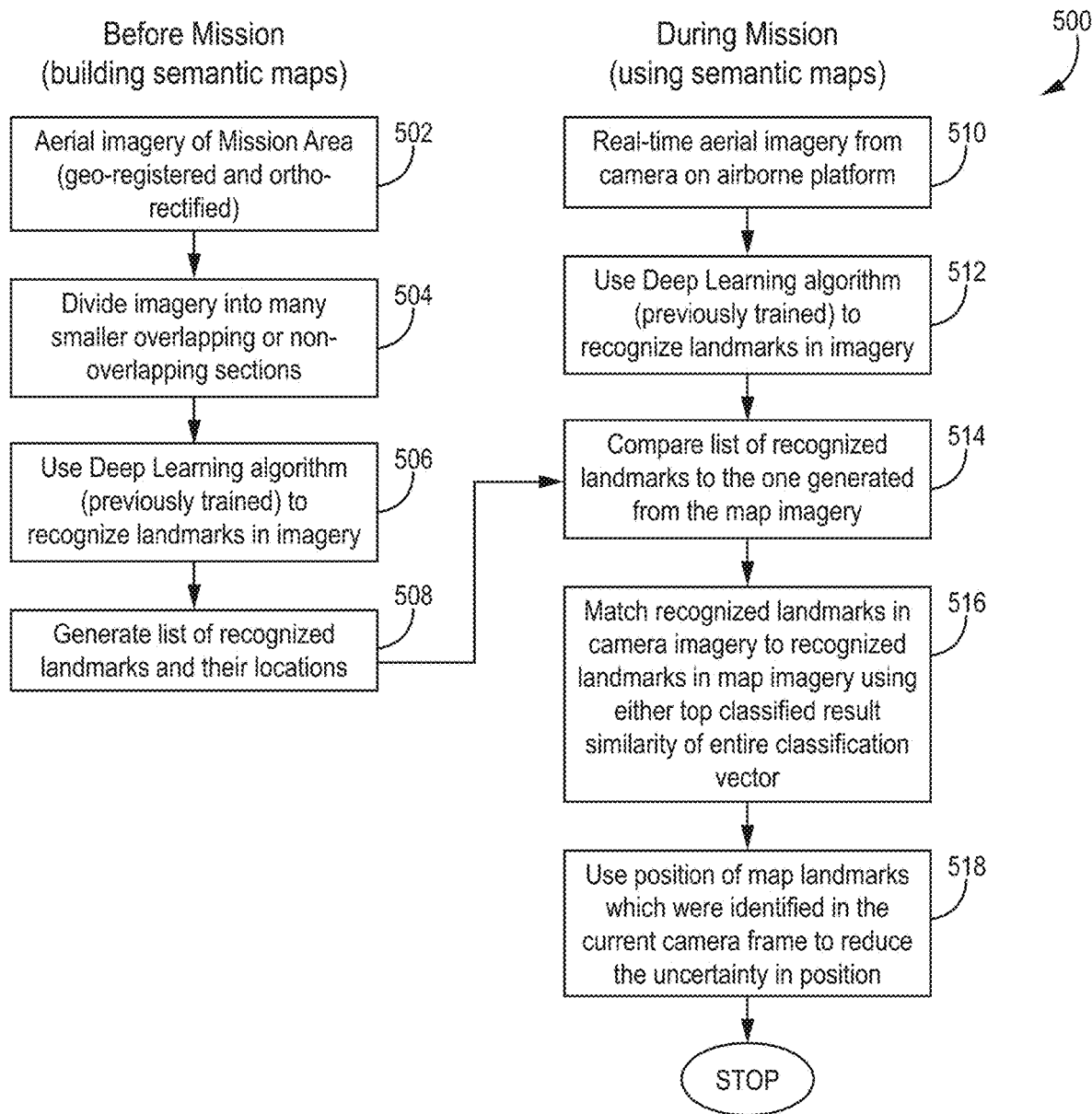
FIG. 5 is a second flow diagram illustrating a method that can be utilized to implement a second example embodiment of the present invention.

FIG. 5 is a second flow diagram illustrating a method 500, which can be utilized to implement a second example embodiment of the present invention. Referring to the example embodiments depicted in FIGS. 1-3 and 5, the exemplary method begins (e.g., prior to a mission for a vehicle involved) with building one or more semantic maps (i.e., graphic organizers or maps of words) by first providing aerial map imagery of the prospective course for the vehicle involved (502). In one embodiment, the aerial map image is geometrically corrected (e.g., "orthorectified") so that the scale of the map image is uniform (i.e., the image has a similar lack of distortion as a map). Next, the aerial map imagery is divided into a plurality of smaller, overlapping or non-overlapping subsections (504). For example, the Deep Learning algorithm in the GPU/VINS 110 can instruct the associated neural network in the GPU/VINS to divide the map image into (e.g., 512 by 512 square) overlapping or non-overlapping subsections. The Deep Learning algorithm is then utilized to recognize the landmarks (e.g., roads, rivers, lakes, houses, schools, parks, etc.) in each subsection (506). Next, the Deep Learning algorithm generates a list of the recognized landmarks and their locations in the subsections of the map image (508).

The exemplary method 500 continues (e.g., during a flight mission for the vehicle involved) by a camera onboard the airborne platform providing a real-time aerial image (510). Next, the Deep Learning algorithm is utilized to recognize the landmarks in the real-time image and generate a list of the recognized objects (512). The Deep Learning algorithm then compares the list of landmarks recognized in the real-time imagery with the list of landmarks recognized in the map imagery (514). Notably, in this exemplary embodiment, the Deep Learning algorithm also generated respective classifications for the landmarks recognized in the map imagery and the real-time imagery. Next, in this embodiment, a matching algorithm performs a search to match recognized landmarks in the map imagery with recognized landmarks in the real-time imagery (516). For example, in one embodiment, the matching algorithm can attempt to match the recognized landmarks by selecting the top (e.g., 5) classifications to search in the map imagery and the real-time imagery. In a second embodiment, the matching algorithm can place the classification sets in vector form and search for similar classification vectors. In order to enhance the search, the matching algorithm utilizes the position information for the landmarks identified in the map image and identified in the current camera frame to reduce the uncertainties in position (518). The method is then terminated.

Notably, in accordance with the teachings of the exemplary embodiments described above, the matching algorithm compares the combined classification results of the images and the base maps (e.g., subsections) involved. However, in other embodiments, the matching algorithm could compare the classification scores as vectors utilizing, for example, such known techniques as Euclidian distance, dot product, or other suitable vector comparison techniques. As such, these methods can be utilized to further reduce the area of the map that the neural network has to search. Additionally, the map search area could be further reduced by waiting until a unique (e.g., rare) classification is observed in the real-time image before initiating a search. For example, while flying over a forest, large areas of the map might be classified as "forest," while some of the areas might be classified as "river" or "pond." In this exemplary case, by waiting until the comparatively rarer "river" or "pond" classification is observed before performing the search, an even greater reduction in the map area that has to be searched can result. Notably, such rare classes can be, for example, predefined and loaded into the VINS as "look for this" categories by the operator knowing that such rare cases will be present along the vehicle's planned trajectory. Furthermore, another method to perform the matching operation could be to utilize temporal information. For example, the matching operation could search for the occurrence of a class sequence (e.g., "dense residential" followed by "park" followed by "forest") as the vehicle moves over such areas in the designated order.

It should be understood that elements of the above described embodiments and illustrative figures may be used in various combinations with each other to produce still further embodiments which are explicitly intended as within the scope of the present disclosure.

Example Embodiments

Example 1 includes a method for reducing map search area requirements in a navigation system, comprising: training a learning algorithm to recognize each one of a plurality of images of different landmarks on a map; dividing an image of the map into a plurality of subsections; deriving a set of classifications for each subsection of the plurality of subsections, wherein each classification of the set of classifications is associated with at least one landmark of the different landmarks on the map; receiving at least one image from an imaging device onboard a vehicle in flight; deriving a classification for the at least one image from the imaging device onboard the vehicle in flight; and comparing the classification for the at least one image with the set of classifications for each subsection of the plurality of subsections of the map, and limiting the comparing to the subsections of the map that have a substantially similar classification to the classification of the at least one image.

Example 2 includes the method of Example 1, wherein the deriving the set of classifications comprises deriving a set of vector classification probabilities.

Example 3 includes the method of any of Examples 1-2, wherein the training comprises training a Deep Learning artificial neural network.

Example 4 includes the method of any of Examples 1-3, wherein the method comprises reducing the map search area requirements in a Visual-Inertial Navigation System (VINS).

Example 5 includes the method of any of Examples 1-4, wherein the receiving the at least one image from the imaging device comprises receiving the at least image from a camera, an imaging device operating in a visible frequency band, an imaging device operating in an infra-red frequency band, an imaging device operating in an ultra-violet frequency band, or an imaging device operating in a millimeter frequency band.

Example 6 includes the method of any of Examples 1-5, wherein the receiving at least one image from the imaging device onboard the vehicle in flight comprises receiving the at least one image from the imaging device onboard an aircraft, an unmanned aerial vehicle (UAV), a spacecraft, a missile, a guided bomb, or a large caliber projectile.

Example 7 includes the method of any of Examples 1-6, wherein the dividing comprises a neural network component in a VINS dividing a base map into a plurality of non-overlapping subsections.

Example 8 includes the method of any of Examples 1-7, wherein the comparing comprises comparing a first combination of classification probabilities with a second combination of classification probabilities.

Example 9 includes the method of any of Examples 1-8, wherein the comparing comprises identifying a plurality of classes in an image, and comparing the plurality of classes in the image with the set of classifications for each subsection of the plurality of subsections of the map.

Example 10 includes the method of Example 9, further comprising limiting the identifying to at least one observed classification that is unique or rare, or to a sequence of observed classifications that are unique or rare.

Example 11 includes a system, comprising: a vehicle; an imaging device onboard the vehicle, wherein the imaging device is configured to generate an image scan, and receive at least one image responsive to the image scan; a processing device, wherein the processing device is configured to receive and store the at least one image; a navigation system onboard the vehicle, wherein the navigation system is configured to store an image of a map; and a learning network associated with the navigation system, wherein the learning network is configured to divide the image of the map into a plurality of map subsections, recognize each one of a plurality of images of different landmarks on the map, generate a set of classifications for each map subsection, and associate each classification of the set of classifications with at least one landmark of the different landmarks on the map.

Example 12 includes the system of Example 11, wherein the learning network is further configured to receive the at least one image responsive to the image scan, generate a classification for the at least one image, compare the classification for the at least one image with the set of classifications for each map subsection, and limit the comparison to the map subsections that have a substantially similar classification to that of the at least one image.

Example 13 includes the system of any of Examples 11-12, wherein the learning network is a Deep neural network.

Example 14 includes the system of any of Examples 11-13, wherein the system is a VINS.

Example 15 includes the system of any of Examples 11-14, wherein the vehicle is at least one of an aircraft, a UAV, a spacecraft, a missile, a guided bomb, or a large caliber projectile.

Example 16 includes the system of any of Examples 11-15, wherein the imaging device is at least one of a camera, a device configured to receive images in a visible frequency band, a device configured to receive images in an infra-red frequency band, a device configured to receive images in an ultra-violet frequency band, or a device configured to receive images in a millimeter frequency band.

Example 17 includes a method, comprising: providing aerial map imagery of an area associated with a prospective mission for a vehicle in flight; dividing the aerial map imagery into a plurality of map subsections; recognizing a plurality of landmarks in the plurality of map subsections; generating a list of the recognized landmarks and their respective locations in the plurality of map subsections; providing real-time aerial imagery during the prospective mission; recognizing a plurality of landmarks in the real-time imagery and generating a second list of the recognized landmarks in the real-time imagery; comparing the second list of the recognized plurality of landmarks in the real-time imagery with the list of the recognized landmarks in the plurality of map subsections; and matching the recognized landmarks in the real-time imagery with the recognized landmarks in the map subsections.

Example 18 includes the method of Example 17, wherein the matching comprises generating a set of vector classification probabilities for the recognized landmarks in the real-time imagery, generating a second set of vector classification probabilities for the recognized landmarks in the map subsections, and matching the set of vector classification probabilities with the second set of classification probabilities.

Example 19 includes the method of any of Examples 17-18, wherein the providing the aerial map imagery of the area associated with the prospective mission for the vehicle in flight comprises a neural network receiving the aerial map imagery.

Example 20 includes the method of any of Examples 17-19, further comprising utilizing position information for landmarks recognized in the aerial map imagery and the current camera image, and thereby reducing uncertainties associated with the positions of the recognized landmarks.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for reducing map search area requirements in a navigation system, comprising:
    training a learning algorithm to recognize each one of a plurality of images of different landmarks on a map;
    dividing an image of the map into a plurality of subsections;
    deriving a set of classifications for each subsection of the plurality of subsections, wherein each classification of the set of classifications is associated with at least one landmark of the different landmarks on the map;
    receiving at least one image from an imaging device onboard a vehicle in flight;
    deriving a classification for the at least one image from the imaging device onboard the vehicle in flight; and
    comparing the classification for the at least one image with the set of classifications for each subsection of the plurality of subsections of the map, and limiting the comparing to the subsections of the map that have a substantially similar classification to the classification of the at least one image.

2. The method of claim 1, wherein the deriving the set of classifications comprises deriving a set of vector classification probabilities.

3. The method of claim 1, wherein the training comprises training a Deep Learning artificial neural network.

4. The method of claim 1, wherein the method comprises reducing the map search area requirements in a Visual-Inertial Navigation System (VINS).

5. The method of claim 1, wherein the receiving the at least one image from the imaging device comprises receiving the at least image from a camera, an imaging device operating in a visible frequency band, an imaging device operating in an infra-red frequency band, an imaging device operating in an ultra-violet frequency band, or an imaging device operating in a millimeter frequency band.

6. The method of claim 1, wherein the receiving at least one image from the imaging device onboard the vehicle in flight comprises receiving the at least one image from the imaging device onboard an aircraft, an unmanned aerial vehicle (UAV), a spacecraft, a missile, a guided bomb, or a large caliber projectile.

7. The method of claim 1, wherein the dividing comprises a neural network component in a VINS dividing a base map into a plurality of non-overlapping subsections.

8. The method of claim 1, wherein the comparing comprises comparing a first combination of classification probabilities with a second combination of classification probabilities.

9. The method of claim 1, wherein the comparing comprises identifying a plurality of classes in an image, and comparing the plurality of classes in the image with the set of classifications for each subsection of the plurality of subsections of the map.

10. The method of claim 9, further comprising limiting the identifying to at least one observed classification that is unique or rare, or to a sequence of observed classifications that are unique or rare.

11. A system, comprising:
    a vehicle;
    an imaging device onboard the vehicle, wherein the imaging device is configured to generate an image scan, and receive at least one image responsive to the image scan;
    a processing device, wherein the processing device is configured to receive and store the at least one image;
    a navigation system onboard the vehicle, wherein the navigation system is configured to store an image of a map; and
    a learning network associated with the navigation system, wherein the learning network is configured to divide the image of the map into a plurality of map subsections, recognize each one of a plurality of images of different landmarks on the map, generate a set of classifications for each map subsection, and associate each classification of the set of classifications with at least one landmark of the different landmarks on the map.

12. The system of claim 11, wherein the learning network is further configured to receive the at least one image responsive to the image scan, generate a classification for the at least one image, compare the classification for the at least one image with the set of classifications for each map subsection, and limit the comparison to the map subsections that have a substantially similar classification to that of the at least one image.

13. The system of claim 11, wherein the learning network is a Deep neural network.

14. The system of claim 11, wherein the system is a VINS.

15. The system of claim 11, wherein the vehicle is at least one of an aircraft, a UAV, a spacecraft, a missile, a guided bomb, or a large caliber projectile.

16. The system of claim 11, wherein the imaging device is at least one of a camera, a device configured to receive images in a visible frequency band, a device configured to receive images in an infra-red frequency band, a device configured to receive images in an ultra-violet frequency band, or a device configured to receive images in a millimeter frequency band.

17. A method, comprising:
    providing aerial map imagery of an area associated with a prospective mission for a vehicle in flight;

dividing the aerial map imagery into a plurality of map subsections;
recognizing a plurality of landmarks in the plurality of map subsections;
generating a list of the recognized landmarks and their respective locations in the plurality of map subsections;
providing real-time aerial imagery during the prospective mission;
recognizing a plurality of landmarks in the real-time imagery and generating a second list of the recognized landmarks in the real-time imagery;
comparing the second list of the recognized plurality of landmarks in the real-time imagery with the list of the recognized landmarks in the plurality of map subsections; and
matching the recognized landmarks in the real-time imagery with the recognized landmarks in the map subsections.

18. The method of claim 17, wherein the matching comprises generating a set of vector classification probabilities for the recognized landmarks in the real-time imagery, generating a second set of vector classification probabilities for the recognized landmarks in the map subsections, and matching the set of vector classification probabilities with the second set of classification probabilities.

19. The method of claim 17, wherein the providing the aerial map imagery of the area associated with the prospective mission for the vehicle in flight comprises a neural network receiving the aerial map imagery.

20. The method of claim 17, further comprising utilizing position information for landmarks recognized in the aerial map imagery and the current camera image, and thereby reducing uncertainties associated with the positions of the recognized landmarks.

* * * * *